United States Patent [19]

Nudelmont

[11] Patent Number: 4,629,992

[45] Date of Patent: Dec. 16, 1986

[54] DEVICE FOR DETECTING THE IONIZATION LEVEL OF A GAS MIXTURE CONTROLLED BY ELECTRIC ARC

[75] Inventor: Jean-Claude Nudelmont, Douville, France

[73] Assignee: P.G.E.P. Professional General Electronic Products, France

[21] Appl. No.: 581,054

[22] Filed: Feb. 17, 1984

[63] Continuation of PCT FR 83/00125, Jun. 17, 1983 published as WO 84/00074, Jan. 5, 1984.

[30] Foreign Application Priority Data

Jun. 17, 1982 [FR] France .............................. 82 10592

[51] Int. Cl.[4] .............................................. G01N 27/68

[52] U.S. Cl. .................................... 324/464; 324/439; 340/629

[58] Field of Search ............... 324/464, 459, 468, 470, 324/439; 436/153; 340/629

[56] References Cited

U.S. PATENT DOCUMENTS

| | | | |
|---|---|---|---|
| 2,550,498 | 4/1951 | Rice | 324/468 |
| 3,582,646 | 6/1971 | Ponsar | 340/629 |
| 3,666,954 | 5/1972 | Sasaki et al. | 340/629 |
| 3,673,586 | 6/1972 | Blackwell | 340/629 |
| 3,728,615 | 4/1973 | Hill et al. | 324/464 |
| 3,949,390 | 4/1976 | Rayl et al. | 340/629 |
| 3,978,397 | 8/1976 | Burry et al. | 324/469 |
| 4,379,290 | 4/1983 | Muggli et al. | 340/629 |

*Primary Examiner*—Stewart J. Levy
*Assistant Examiner*—Kevin D. O'Shea
*Attorney, Agent, or Firm*—Darby & Darby

[57] ABSTRACT

Ionization of a medium being monitored is caused by an electric arc between a first pair of electrodes, while the conductivity of the medium between two measuring electrodes controls at least one feedback circuit which indicates relative rates of decay of the ions, as a function of variations in the number and mobility of ionized particles in the ambient medium.

12 Claims, 8 Drawing Figures

Figure 1:
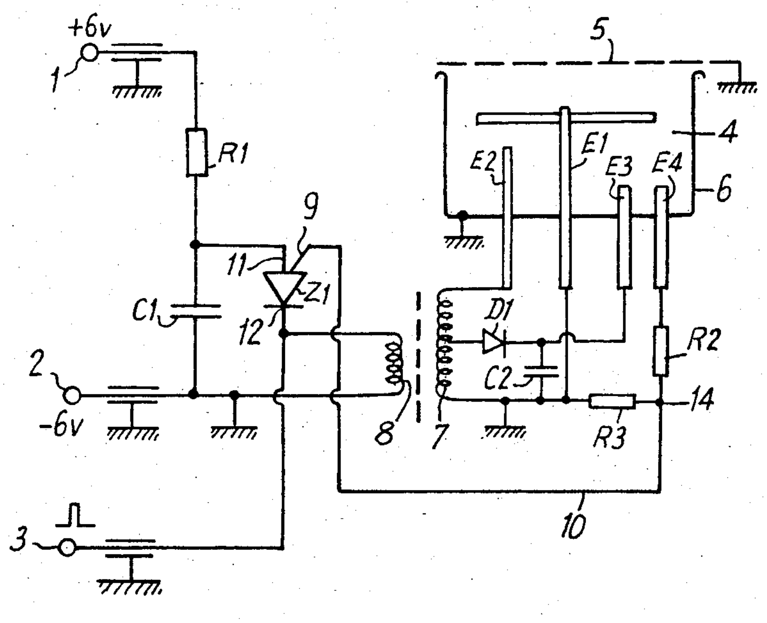

DEVICE FOR DETECTING THE IONIZATION LEVEL OF A GAS MIXTURE CONTROLLED BY ELECTRIC ARC

This is a continuation of application Ser. No. PCT/FR83/00125, filed June 17, 1983 published as WO 84/00074, Jan. 5, 1984.

This invention relates to a device for detecting the ionization level of a gas mixture controlled by electric arc.

Utilization of ionic fire-detecting devices is already largely widespread owing to the very fast response of these devices and to their low sensitivity to the detrimental action of gases.

However, since ionic detectors of already known types are essentially formed of two chambers, one of them open so as to be in contact with the environment being monitored and the other being practically closed having only a very small leakage, both of them receiving radiations from a radioactive sample, it is clear that their utilization is hardly advisable in some cases.

When the radioactive sample of the aforementioned detector is ionizing the air or other gaseous medium contained within both chambers, it is normally observed that conductivities between the measuring electrodes are identical in both chambers. However, as soon as the ambient medium in which the detector finds itself, as the ambient medium permeates into the open chamber, undergoes variations of ionization or conductivity, such as, e.g., in case of a first outbreak, collisions occur between particles and ions present in the open chamber, thus bringing about a substantial decrease of conductivity. Conductivity in the closed chamber, however, remains practically unchanged during an appreciable length of time. The extremely fast detection of this difference of conductivity makes it possible to detect the appearance of other sources of pollution.

The drawback of such devices in some industries like agricultural industry is obvious, since their utilization would allow radioactive particles to contaminate food products, thus bringing about serious hazards for consumers. Besides this, whatever may be the fields of utilization of these devices, it is always indispensable that they may be recovered after a fire, which is not always feasible, so that there is a risk that radioactive material may contaminate the drinking water supply system with run-off water which has been in contact with the unrecovered devices.

The subject of this invention is an ionization level detecting device, characterized in that the ionization of the medium being monitored is caused by an electric arc between a first pair of electrodes, while the conductivity of the medium between two measuring electrodes controls at least one feedback circuit which indicates relative rates of decay of the ions, as a function of variations in the number and mobility of ionized particles in the ambient medium.

There is thus avoided the use of radioactive materials, while the two distinct chambers provided for comparing the conductivities of two temporarily distinct media are replaced by a single chamber.

Another feature of the invention consists in compensating the fast disappearance of ions, as a result of their impact upon the particles of the medium penetrating into the conductivity measuring chamber, by means of a feedback circuit controlling the striking of an electric arc having a very brief duration.

The advantage of this method lies not only in the repetition of measurements through the formation of ions, but also in the comparison of results between two re-strikings of the arc for eventually discriminating the types of ions being formed as a function of their mobility. It will thus be possible to follow the evolution of a specific phenomenon such as for instance the phase of emission of heavy or light particles during a fire. Also, the discontinuous creation of arcs causing the ionization brings about a considerable reduction in the energy consumption required for the operation of the device.

Another feature of the detector is the insertion of a circuit comparing the results of two successive measurements of conductivity. Since this circuit may comprise simple analog components, while the arc control device may provide voltages in the range of 6,000 to 2,000 V with a very short duration in the range of 100 to 500 nanosec. with a current of approximately 1 microampere, it thus becomes possible to use an extremely low power of about 16 picowatt for ensuring the ionization of the measuring chamber, the total consumption of the components of the other circuits being limited for instance at 20 microwatt.

Further characteristics and advantages of the invention will appear from the following description made with reference to the drawings which represent as a non-limiting example an embodiment of this invention and modifications of the circuits which control the signalling of measurements.

Figure 2:
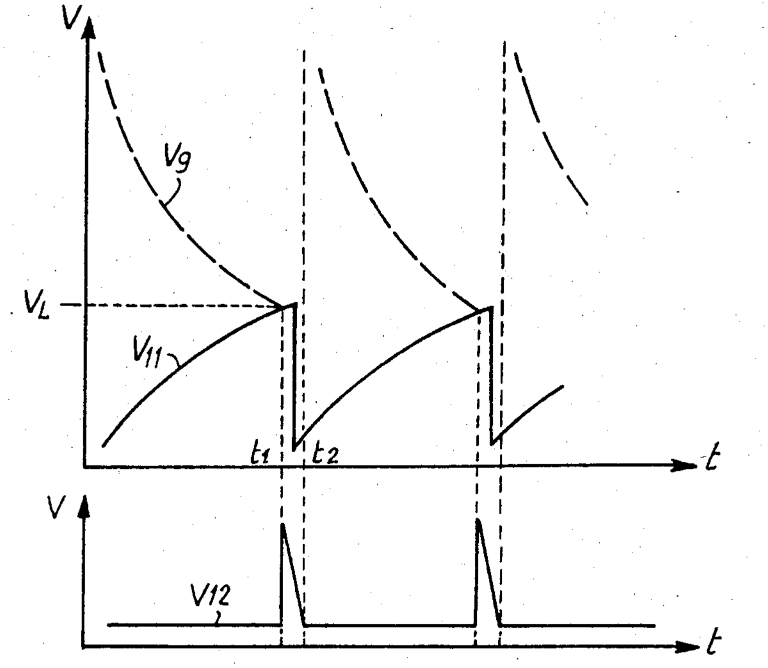
Figure 3:
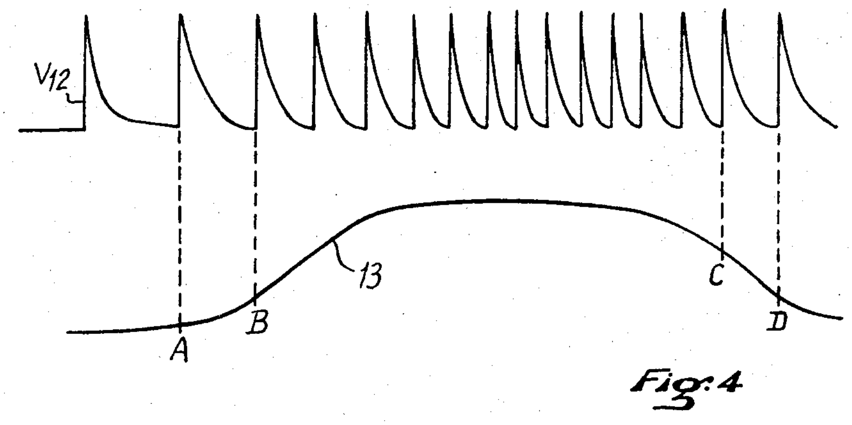
Figure 4:
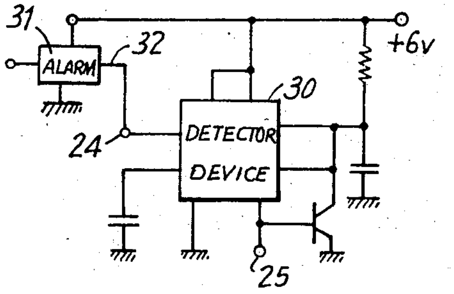
Figure 6:
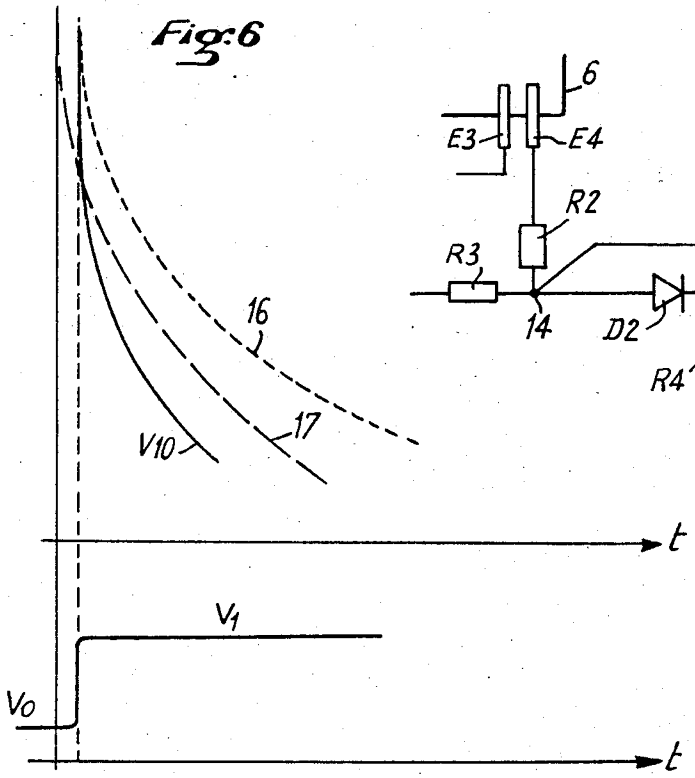
Figure 5:
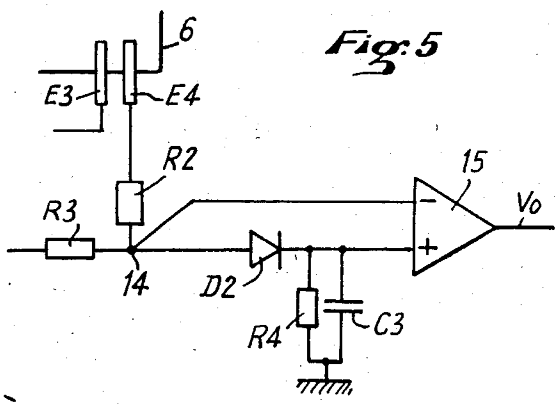
Figure 7:
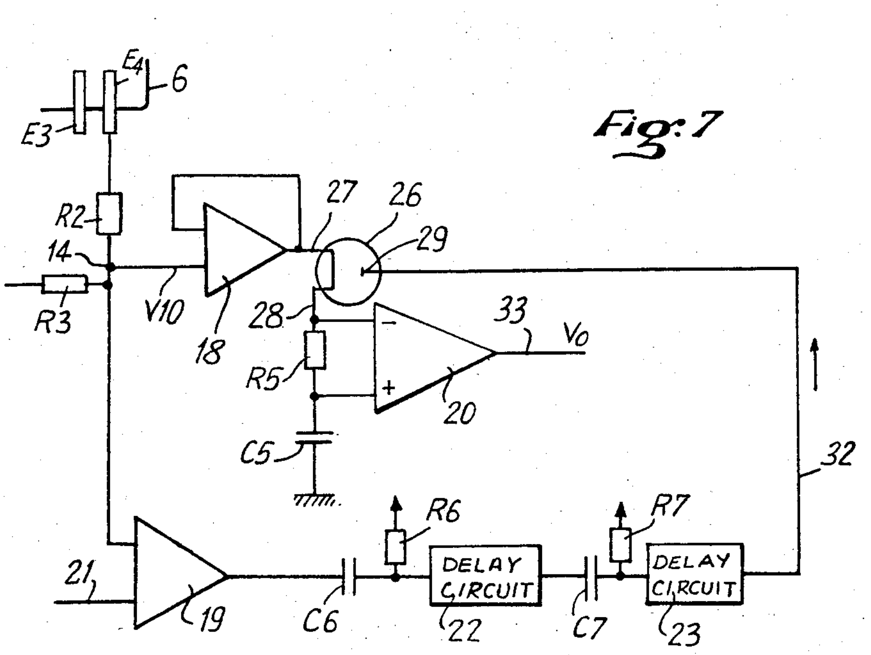
Figure 8:
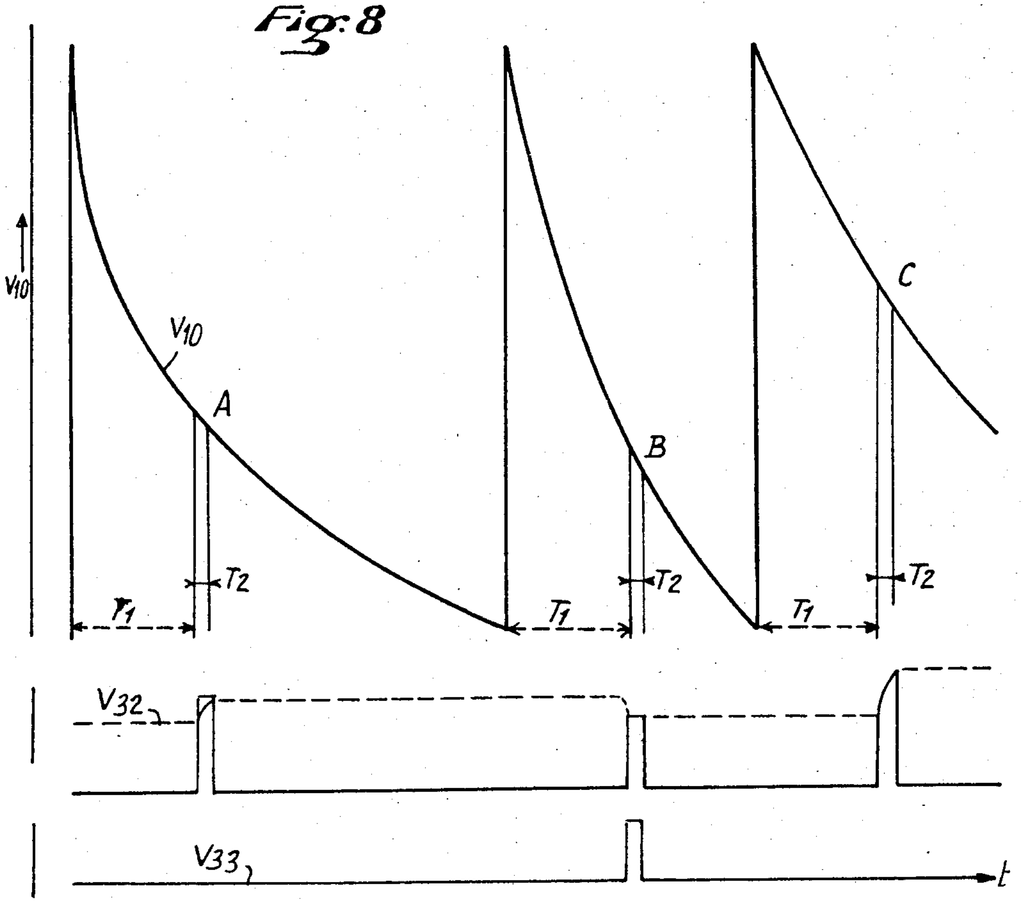

FIG. 1 is a diagrammatic representation of the device and its circuits,

FIG. 2 is a diagram showing the control voltages for controlling the transistor which triggers the electric arc, FIG. 3 is an example of the succession of arc control voltages and of the variation of conductivity between measuring electrodes, FIG. 4 is a diagram of a circuit for signalling the detection of a conductivity drop, FIG. 5 is a modification of the device of FIG. 4, FIG. 6 is a diagram of the voltages of the circuit controlling the striking of the electric arc, FIG. 7 a modification of the device of FIG. 5, FIG. 8 an example of the voltages controlling the signalling device shown in FIG. 7.

The detector shown diagrammatically in FIG. 1 comprises essentially one single chamber 4, the aperture of which is covered by a fine protection grid 5, grounded. The grid makes it possible, among others, to suppress interference from radioelectric transmissions. Electrodes $E_1$ and $E_2$ which serve to produce intermittent arcs, as well as electrodes $E_3$ and $E_4$ which serve to measure the conductivity of the medium, are supplied with a voltage from the windings 7 of a transformer, the primary winding 8 of which is controlled by the gate 9 of transistor $Z_1$. This gate is connected through line 10 to the circuit measuring the conductivity of the space between electrodes $E_3$ and $E_4$.

The primary winding 8 is energized from terminals 1 and 2 connected to any power supply unit delivering respectively a positive voltage, for instance +6 V, to terminal 1 and a negative voltage of −6 V to terminal 2. The reference voltage on terminal 3 may be +6 V. As long as $Z_1$ is not conducting, capacitor $C_1$ connected between the ground and terminal 1 through resistor $R_1$ becomes charged. When the voltage of anode 11 rises above the voltage of gate 9, capacitor $C_1$ discharges across $Z_1$ into the primary winding 8 of the transformer.

Since the discharge takes place within an extremely short time, a large voltage appears on the terminals of the secondary winding 7 which are connected to electrodes $E_1$ and $E_2$, thus striking an electric arc between these electrodes. An increase of ionization of the medium contained in chamber 4 increases the conductivity between electrodes $E_3$ and $E_4$, thus causing an increase of the voltage of gate 9. Since capacitor $C_1$ has just been discharged, it will be seen that the voltage of gate 9 will rise above the voltage of anode 11 within a very short time, as the discharge of the capacitor causes $Z_1$ to cut off immediately the power supply to winding 8.

It will be seen that as soon as chamber 4 becomes ionized, capacitor $C_2$ becomes charged up to a certain value and that the moment when the voltage of gate 9 will exceed the anode voltage is a function of the conductivity of the space located between electrodes $E_3$ and $E_4$, as well as of the values of resistors $R_2$ and $R_3$. As a result, if the conductivity between $E_3$ and $E_4$ varies in the course of time, owing to a fast disappearance of ions caused by the entry into chamber 4 of particles such as may for instance be emitted during a fire, the frequency of arc striking between $E_1$ and $E_2$ will increase. There is thus obtained a convenient means for detecting pollution in the environment of chamber 4.

FIG. 2 shows in $V_9$ the decreasing curve of voltage of gate 9 which causes $Z_1$ to become suddenly conducting, when the anode voltage shown in $V_{11}$ exceeds the value $V_L$ of the $V_9$ voltage of gate 9. Voltage $V_{12}$ on the cathode 12 will then rise abruptly at instant $t_1$ and will then decrease until instant $t_2$. Capacitor $C_1$ is charged again and the cycle is repeated.

In FIG. 3 is shown a succession of pulses controlling the electric arc which causes the ionization of chamber 4, together with the conductivity-versus-time curve 13 during the detection of a certain pollution which is further detected by means of the frequency of pulses $V_{12}$ which cause an arc to strike between electrodes $E_1$ and $E_2$.

FIG. 4 shows a detector device 30 by means of which an alarm signal of any kind may be triggered. This device 30 may comprise for instance a circuit for detecting a missing pulse, this circuit being of a known type such as the one available in the trade under the reference "Philips 555". It will be sufficient to connect this circuit to the components shown in the diagram FIG. 1 by joining input 25 of the detection circuit to terminal 3 of the circuit of FIG. 1. Output 24 of the detection device 30 is connected to any appropriate alarm device 31, so that, when pulses are spaced as shown in FIG. 3, before the conductivity increase, circuit 30 will deliver a normal response between A and B. On the contrary, between points B and C, the increase of the frequency of pulses $V_{12}$ gives rise to a signal on output 24 of the detector device 30. This signal is carried along line 32 to the alarm device 31 which is thus triggered. The trigger signal from output 24 will vanish only after the initial frequency is restored at C.

FIG. 5 shows a modified embodiment of the circuit controlling the signalling device. In this embodiment, the junction point 14 of resistors $R_2$ and $R_3$ is connected, on one hand directly to the negative input of an operational amplifier 15, and on the other hand to the positive input of amplifier 15 through the circuit formed by diode $D_2$ with the delay line composed of resistor $R_4$ and capacitor $C_3$.

FIG. 6 shows in 16 the decrease curve of conductivity in the normal medium being monitored by the ionic detector, and in 17 the voltage drop curve on the input to circuit $R_4$ - $C_3$ versus time, this circuit having been adjusted beforehand so that at any time the value of the voltage represented by curve 17 will be less than the value shown on curve 16. The voltage shown by curve 17 serves as a reference threshold and makes it possible, as soon as particles enter chamber 4 and cause a decrease in the number of ions in the gap between $E_3$ and $E_4$, to control the operational amplifier 15, as the curve of voltage $V_{10}$ at the junction point 14 decreases faster than the voltage in circuit $R_4$ - $C_3$. The output voltage $V_o$ from amplifier 15 may be used for triggering any alarm circuit such as 31, for instance.

This very simple circuit for controlling the signalling device has the advantage of being highly sensitive, and it is particularly appropriate for monitoring media in which moisture and temperature are relatively constant.

When the medium being monitored is likely to present moisture and temperature variations affecting the mobility of ions as well as the speed of their disappearance, the device controlling the signalling system may be replaced with the device shown in FIG. 7 which provides a comparison between voltage $V_{10}$ at junction point 14 after a predetermined time $T_1$ following the striking of the arc which causes ionization, with the previous value of this voltage $V_{10}$ having been recorded beforehand.

For this purpose, voltage $V_{10}$, representative of the conduction between electrodes $E_3$ and $E_4$, is injected into the operational amplifier 18 serving as an impedance transformer, so that the same voltage from source $V_{10}$ is fed to terminal 27 of a MOS-type transistor 26, the drain of which is connected at 28 to the negative input of amplifier 20 and to resistor $R_5$.

The gate 29 controlling the conduction of MOS transistor 26 serving as a switch is linked through line 32 to the delay circuit 23. This circuit causes a transmission delay $T_2$, FIG. 8, of the signal delivered by the differential circuit $C_7$ - $R_7$. This signal comes from amplifier 19 via circuit $C_6$ - $R_6$ and via delay circuit 22 which introduces the delay $T_1$ shown in FIG. 8.

As soon as voltage $V_{10}$ exceeds a reference value applied to the input 21 of amplifier 19, this amplifier will send a negative pulse to circuit 22 differential circuit $C_6$ - $R_6$. This pulse is in turn further delayed, the delay being time $T_2$, as the pulse is next applied to delay circuit 23.

As a result, when voltage $V_{10}$ is fed through the switching MOS transistor 26 to terminal 28 and to circuit $R_5$ - $C_5$, if the voltage of capacitor $C_5$, representing the previous value of $V_{10}$, this being the case for values B and C, FIG. 8, is less than the new value of $V_{10}$, the output 33 of amplifier 20 remains at the zero value.

On the contrary, when the previous value of $V_{10}$, represented by the voltage of $C_5$, exceeds the new value, this being the case for values B and A, FIG. 8, the new value is recorded by $C_5$ and the output 33 of amplifier 20 delivers a signal which is transmitted to any alarm device such as 31.

It is thus possible to achieve a precise analysis of overall variations of the decrease in the conductivity of the medium, as well as variations caused by different mobilities of ions.

I claim:

1. A device for detecting an ionization level of a gaseous medium in a chamber, comprising:

a first pair of electrodes in said chamber;

a charging circuit for producing electric arcs at a predetermined frequency between said electrodes connected to said first pair of electrodes;

a second pair of electrodes in said chamber; and a feedback circuit connected to said charging circuit, said feedback circuit including means for varying said predetermined frequency at which said charging circuit produces said electric arc, said feedback circuit also being connected to said second pair electrodes, and responsive to a conductivity value of said gaseous medium in said chamber between said second pair electrodes.

2. The device of claim 1, wherein said charging circuit is adapted to deliver an arc having voltage ranging from 6,000 volts to 12,000 volts for a duration ranging from 100 to 500 nanoseconds.

3. The device of claim 1, wherein said charging circuit includes a transformer having a primary winding and a secondary winding, said secondary winding connected to said second pair of electrodes, and a charging capacitor connected to said transformer primary winding, said primary winding also being responsive to said feedback circuit.

4. The device of claim 3, wherein said first pair electrodes are also connected to said transformer secondary winding.

5. The device of claim 3, further comprising:

frequency variation-detecting means connected to said charging circuit for detecting variation in said predetermined frequency of said electric arcs; and means responsive to said frequency variation-detecting means for providing an alarm signal when said conductivity value drops.

6. The device of claim 5, wherein said frequency variation-detecting means is a missing pulse detector.

7. The device of claim 2, wherein said charging circuit includes a transformer having a primary winding and a secondary winding, said secondary winding connected to said second pair of electrodes, and a charging capacitor connected to said transformer primary winding, said primary winding also being responsive to said feedback circuit.

8. The device of claim 7, further comprising:

frequency variation-detecting means connected to said charging circuit for detecting variation in said predetermined frequency of said electric arcs; and means responsive to said frequency variation-detecting means for providing an alarm signal when said conductivity value drops.

9. The device of claim 8, wherein said frequency variation-detecting means is a missing pulse detector.

10. The device of claim 1, further comprising:

decreasing voltage circuit means connected to said second pair electrodes for generating a decreasing voltage signal lower in voltage than another signal representative of normal decay of ionization of said gaseous medium between said second pair electrodes;

an operational amplifier having one input connected to said decreasing voltage circuit means, and a second input connected to said feedback circuit.

11. The device of claim 1, further comprising:

memory means connected to said feedback circuit for storing a signal representative of said conductivity value;

an first operational amplifier connected to said feedback circuit, said first operational amplifier further connected to alarm means for providing an alarm signal in response to a predetermined output of said first operational amplifier;

control means for selectively providing a control signal for applying said signal representative of said conductivity value to both said memory means and to said first operational amplifier, an output of said control means connected to two delay circuits.

12. The device of claim 11, wherein said control means comprises a switching mode MOS transistor connected to a second operational amplifier via said two delay circuits, one input of said second operational amplifier connected to means for providing a reference voltage, and another input of said second operational amplifier connected to said feedback circuit.

* * * * *